No. 778,050. PATENTED DEC. 20, 1904.
H. F. LANGENHOP.
GRATE.
APPLICATION FILED OCT. 14, 1903.
NO MODEL. 2 SHEETS—SHEET 1.
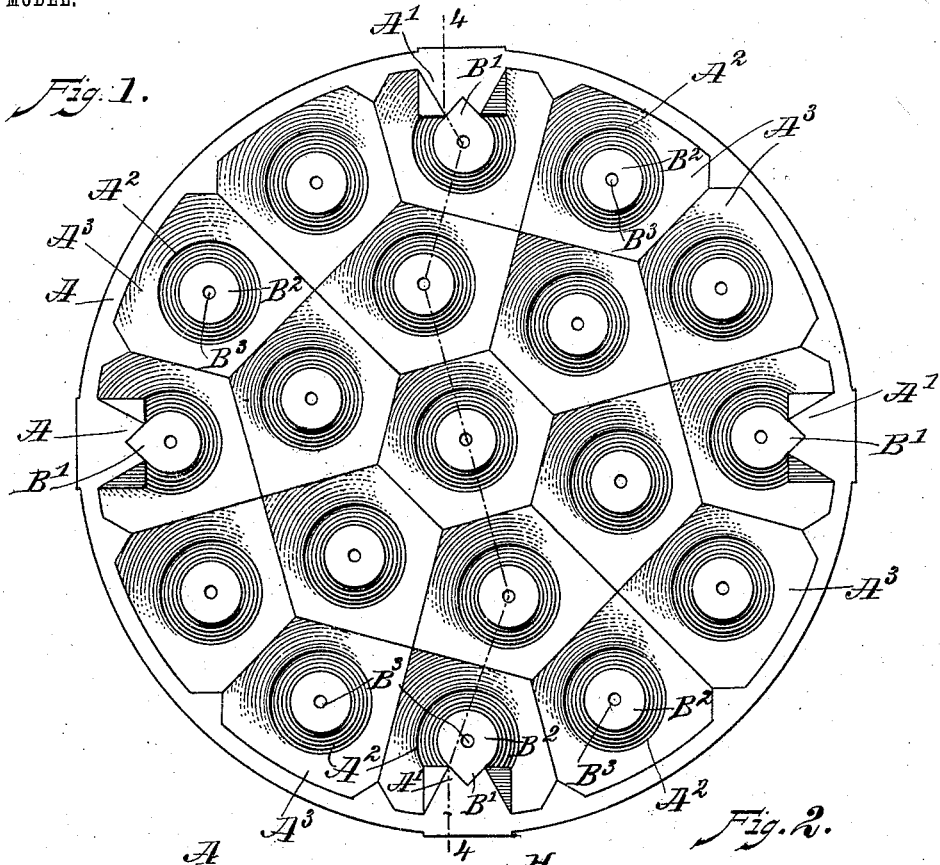
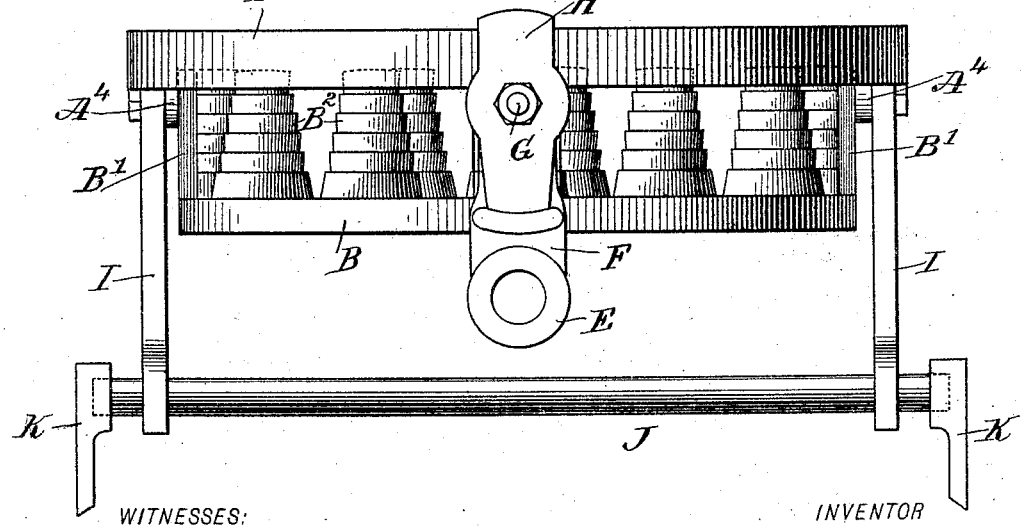
WITNESSES:
INVENTOR
Herman F. Langenhop
BY
ATTORNEYS.

No. 778,050. PATENTED DEC. 20, 1904.
H. F. LANGENHOP.
GRATE.
APPLICATION FILED OCT. 14, 1903.
NO MODEL. 2 SHEETS—SHEET 2.
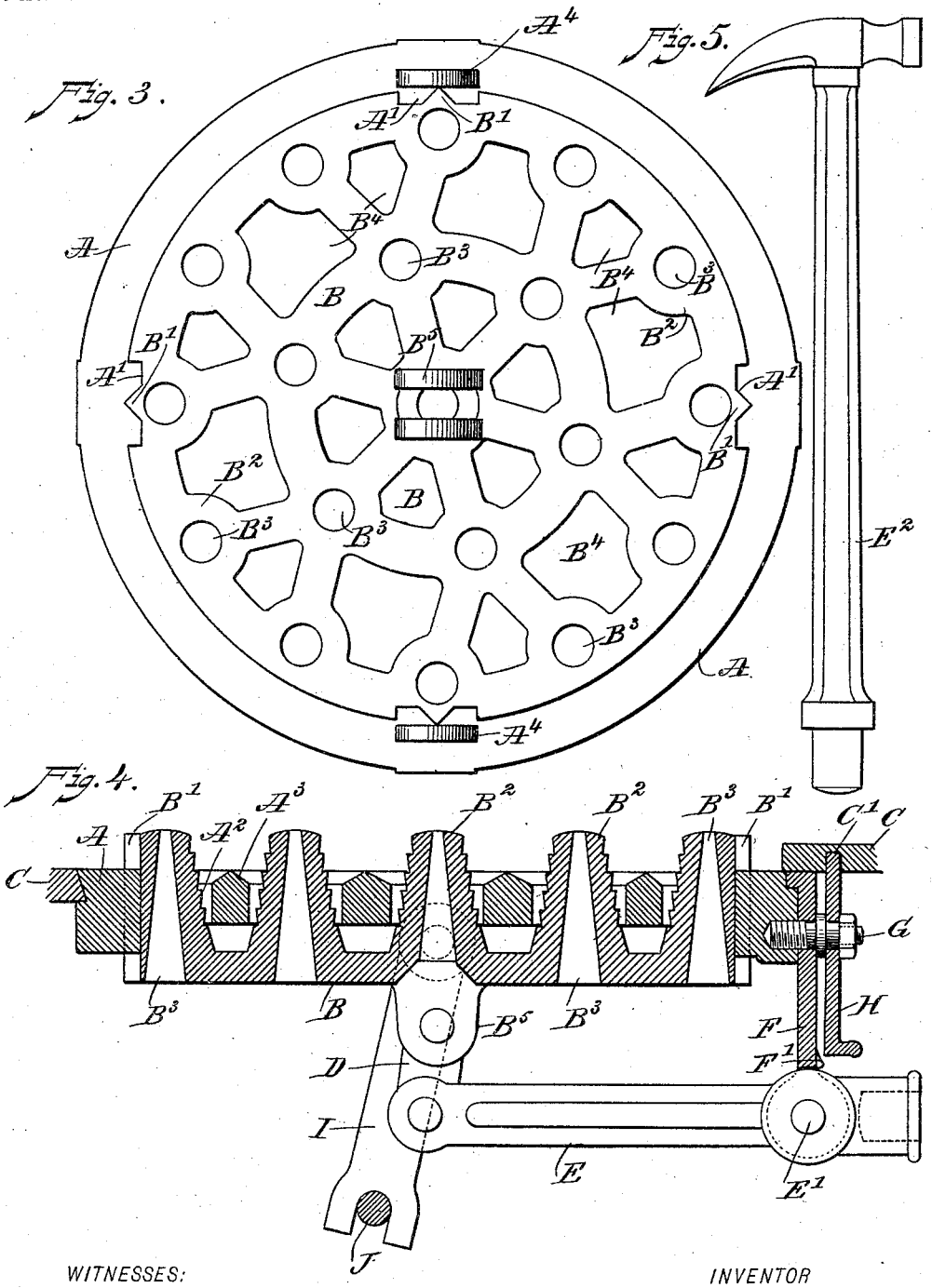
WITNESSES:
INVENTOR
Herman F. Langenhop
BY
ATTORNEYS.

No. 778,050. Patented December 20, 1904.

UNITED STATES PATENT OFFICE.

HERMAN F. LANGENHOP, OF NEW YORK, N. Y.

GRATE.

SPECIFICATION forming part of Letters Patent No. 778,050, dated December 20, 1904.

Application filed October 14, 1903. Serial No. 177,006.

*To all whom it may concern:*

Be it known that I, HERMAN F. LANGENHOP, a citizen of the United States, and a resident of the city of New York, borough of Manhattan, in the county and State of New York, have invented a new and Improved Grate, of which the following is a full, clear, and exact description.

The invention relates to heaters, ranges, stoves, and furnaces; and its object is to provide a new and improved grate which is simple and durable in construction, very effective in operation, and arranged to enable the attendant to readily and thoroughly rake the burning fuel and free the same from ashes, cinders, and the like and to insure a ready access of air to the burning fuel to insure complete combustion.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is a side elevation of the same. Fig. 3 is an inverted plan view of the normally fixed and the movable grate member. Fig. 4 is a transverse section of the improvement on the line 4 4 in Fig. 1, and Fig. 5 is a side elevation of the shaker.

The improved grate consists, essentially, of a member A and a member B, the member A being normally fixed and the member B being movable and arranged below the member A and mounted to be moved up and down, as hereinafter more fully described, and the said normally fixed member A fits at its peripheral face onto the bottom of a fire-pot C, as plainly shown in Fig. 4.

The movable member B is provided at its sides with vertically-extending slides $B'$, mounted to move in correspondingly-shaped bearings $A'$, formed on the fixed grate member A, and on the top of the said movable member B are arranged spaced finger-bars $B^2$, extending upwardly into apertures $A^2$, formed in the fixed member A. The finger-bars $B^2$ are each preferably in the shape of a frustum of a cone, and the sides thereof are stepped, and an aperture $B^3$ extends from the bottom of the member B to the top of each finger-bar $B^2$ to allow air to pass into the burning fuel by way of the finger-bars.

The apertures $A^2$ in the normally fixed member A are of a diameter to allow the base end of the finger-bars to close the apertures at the bottom at the time the member B is moved into its uppermost position. The upper portions $A^3$ of the walls of the apertures $A^2$ are preferably beveled outwardly and upwardly, as plainly indicated in Figs. 1 and 4, so that the fuel readily slides toward the finger-bars $B^2$, and when the member B is moved up or down then the burning fuel is readily agitated, so as to free the fuel from the ashes which drop through the apertures $A^2$ into the ash-pit below. The member B is further provided with apertures $B^4$ between the finger-bars $B^2$, so as to allow air to readily pass through the said apertures $B^4$ to the apertures $A^2$ and to the fuel to supply the latter with the necessary air for proper combustion.

In order to impart an up-and-down sliding motion to the movable grate member B, the following device is provided: On the under side of the member B and at the center thereof depend spaced lugs $B^5$, pivotally connected by a link D with the inner end of a raking-lever E, fulcrumed at $E'$ on a bracket F, secured by a screw G to the normally fixed member A, and on the said screw G is mounted to swing a catch H, adapted to engage a slot $C'$, formed on the under side of the bottom of the fire-pot C, to lock the normally fixed member A normally in position on the under side of the fire-pot. The outer end of the raking-lever E is adapted to be engaged by one end of a removable shaker $E^2$ under the control of the operator for imparting a swinging motion to the lever E, so as to move the member B up and down to rake the fire by the action of the finger-bars $B^2$ on the fuel.

In order to limit the downward sliding movement of the member B, the bracket F is provided with a lug $F'$, adapted to be engaged by the forward end of the lever E, as indicated in Fig. 4. Now by the arrangement described the member B can only slide downward a predetermined distance—that is, so far down that the tops of the finger-bars B² do not pass out of the apertures A² of the member A.

The sides of the normally fixed member A are provided on the under side with depending lugs A⁴, pivotally connected with links I, hung on a shaft J, mounted in suitable bearings K, formed on the sides of the casing in which the grate is located, and when it is desired to dump the contents on the grate then the operator swings the catch H out of engagement with the slot C′ to unlock the member A, so that the operator by manipulating the lever E can swing the member A, and with it the member B, downward to dump the contents of the grate, it being understood that the member A then swings on the links I with the shaft J as a fulcrum. When the contents are dumped, then the member A, and with it the member B, is swung back to its normal position and locked in place by the catch H, moved in engagement with the slot C′.

From the foregoing it will be understood that when the member B is moved to its uppermost position the upper ends of the finger-bars B² project up beyond the top of the member A, so as to thoroughly agitate the burning fuel, to separate the ashes from the coal or other fuel used, and to allow the ashes to readily drop through the apertures A² and B⁴ down into the ash-pit, and some of the ashes may also fall through the openings B³ down into the ash-pit.

Having thus described my invention, I claim as new and desire to secure by Letters Patent—

1. A grate comprising a normally stationary member having apertures and mounted to be swung back and forth maintaining a constant horizontal position, and also to be tilted for dumping purposes, a second grate member carried by said stationary member and having guided vertical movement with respect thereto, said second member having finger-bars extending into the apertures of the stationary member, said finger-bars having draft-holes and being in frusto-conical shape, with their sides stepped, and means for moving the second grate member up and down with respect to the normally stationary member and imparting said swinging motion to the two members combined.

2. A grate comprising a normally stationary member having apertures and mounted to be swung back and forth maintaining a constant horizontal position, a grate member having guided vertical movement with respect to the said normally stationary member and provided with finger-bars having draft-holes, the finger-bars being in frusto-conical shape, with the sides stepped, means for moving the movable grate member up and down with respect to the normally stationary member and imparting said swinging motion to the two members combined, and a locking device for locking the normally stationary member in position in the fire-pot.

3. In a grate, a normally stationary member having openings, bearings beneath the grate in the sides of the casing in which the grate is located, a transverse shaft mounted in said bearings, parallel links pivotally connected at their upper ends to said normally stationary member at opposite sides thereof, and at their lower ends to said transverse shaft to permit the normally stationary member to be swung and to permit of tilting the same for dumping purposes, and a catch for locking said member in its normal stationary position.

4. In a grate a normally stationary grate member having openings, bearings beneath the grate in the sides of the casing in which the grate is located, a transverse shaft mounted in said bearings, parallel links pivotally connected at their upper ends to said normally stationary member at opposite sides thereof, and at their lower ends to said transverse shaft to permit of swinging the normally stationary member and of tilting the same for dumping purposes, a catch for locking said grate member in its normal stationary position, a bracket rigidly secured to said member and extending downwardly therefrom, a rake-lever pivoted to the lower end of said bracket and extending inwardly to a point beneath the center of the grate, a second grate member located beneath said normally stationary member and having guided vertical movement with respect thereto, said second member also having vertical finger-bars extending upwardly through the apertures in said normally stationary member, a link having pivotal connection at its upper end with the central portion of said second grate member and at its lower end with the inner end of said rake-lever whereby said second grate member is pivotally supported upon the inner end of said rake-lever, the rake-lever itself being supported upon said rigid bracket extending from the normally stationary grate member, the outer end of said rake-lever extending outwardly beyond said bracket to be engaged for shaking and dumping the grate, and a stop, for limiting the movement of said rake-lever.

5. In a grate, a normally stationary member having apertures, a second grate member having vertical guided movement with respect to said normally stationary member, and provided with finger-bars having draft-holes, the finger-bars being in frusto-conical shape with the sides stepped, lugs extending downwardly from diametrically opposite sides of said normally stationary member, bearings beneath the grate in the sides of the casing in which the grate is located, a transverse shaft mounted in said bearings, parallel links pivotally connected at their upper ends to said lugs, and at their lower ends to said transverse shaft to permit the stationary member to be rocked for dumping purposes, a downwardly-extending bracket rigidly secured to one side of the stationary member of the grate, said bracket having a bearing at its lower end, downwardly-extending ears on the under side of said second member at its center, a link pivotally connected at its upper end to said ears and extending downwardly therefrom, a raking-lever extending at right angles to said transverse shaft, and pivotally connected at its inner end to the lower end of said link and near its outer end having pivotal connection with the bearing at the lower end of said bracket, the movable member of the grate being supported from said bracket by said raking-lever, said bracket having a stop to be engaged by said lever to limit the downward movement of the inner end of the lever, said lever having means at its outer end to be engaged by a shaker to slide the movable part of the grate up and down upon the stationary part, the bearing at the lower end of said bracket forming a fulcrum-point for the raking-lever, and a catch secured to the stationary part of said grate at the upper end of said bracket, said catch being adapted to engage with the fire-pot of the furnace to hold the grate in its normal position.

6. In a grate a normally stationary member having openings, a horizontal shaft suitably supported beneath the grate within the casing in which the grate is located, said shaft being at one side of the center of the grate, inclined parallel links pivotally connected at their upper ends to said stationary member at diametrically opposite sides thereof and at their lower ends to said transverse shaft, said grate being adapted to be tilted upon said links and also to be swung thereupon and to come into engagement with the side of the fire-pot when swung in one direction, and a catch at the side of the grate opposite said point of engagement for locking the grate in engagement with said fire-pot, the leaning or inclination of said parallel links being in the direction of said catch to cause the grate to swing in the direction away from its point of engagement with the fire-pot when the catch is released.

In testimony whereof I have signed my name to this specification in the presence of two subscribing witnesses.

HERMAN F. LANGENHOP.

Witnesses:
THEO. G. HOSTER,
EVERARD B. MARSHALL.